US007142962B1

(12) United States Patent
Pflieger et al.

(10) Patent No.: US 7,142,962 B1
(45) Date of Patent: Nov. 28, 2006

(54) METHOD FOR THE WIRELESS DEFECT ELIMINATION ON A MOTOR VEHICLE

(75) Inventors: Stephan Pflieger, Munich (DE); Robert Hassemer, Munich (DE); Stefan Baader, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/440,020

(22) Filed: May 25, 2006

Related U.S. Application Data

(63) Continuation of application No. PCT/EP2006/001841, filed on Feb. 28, 2006.

(51) Int. Cl.
*G01M 17/00* (2006.01)
*G06F 19/00* (2006.01)
*G06F 7/00* (2006.01)

(52) U.S. Cl. ............................ 701/29; 701/32; 701/33; 701/34

(58) Field of Classification Search .................... 701/1, 701/29, 30, 31, 32, 33, 34, 35; 340/426.23, 340/901, 463, 464, 500, 504, 516, 517, 524
See application file for complete search history.

(56) References Cited

U.S. PATENT DOCUMENTS 6,192,302 B1 * 2/2001 Giles et al. .................. 701/29
6,330,499 B1 * 12/2001 Chou et al. .................. 701/33
6,370,454 B1 * 4/2002 Moore ......................... 701/29
6,577,937 B1 * 6/2003 Shuman et al. ............... 701/48
6,959,235 B1 * 10/2005 Abdel-Malek et al. ........ 701/33
7,016,774 B1 * 3/2006 Barber et al. ................ 701/30

* cited by examiner

*Primary Examiner*—Richard M. Camby
(74) *Attorney, Agent, or Firm*—Crowell & Moring LLP

(57) ABSTRACT

A system and method for the wireless diagnosis, elimination of a defect, for a servicing or for preparing a servicing of a motor vehicle are provided. A checking device checks whether the vehicle has a technical defect, whether a vehicle servicing should be carried out or whether the driver is requesting assistance, for example, breakdown assistance by pressing a button. A status determining device determines which electrical or electronic components, hardware, assigned software versions are present in the vehicle, defects have occurred during the operation of the vehicle and were stored in the vehicle in the form of defect data, or which vehicle servicing should be carried out and which corresponding servicing data were stored in the vehicle.

14 Claims, 2 Drawing Sheets

METHOD FOR THE WIRELESS DEFECT ELIMINATION ON A MOTOR VEHICLE

CROSS REFERENCE TO RELATED APPLICATIONS

This application claims priority under 35 U.S.C. § 120 to International Patent Application No. PCT/EP2006/001841 filed Feb. 28, 2006, the entire disclosure of this document is herein expressly incorporated by reference.

BACKGROUND AND SUMMARY OF THE INVENTION

The present invention relates to a method for the wireless diagnosis, elimination of a defect, for a servicing and/or for preparing a servicing of a motor vehicle.

Assignee of the present application provides a breakdown service in which, in the event of a vehicle breakdown, vehicle-specific data together with the actual position of the vehicle are transmitted by SMS to the breakdown service when the driver presses a button. The breakdown service then contacts the concerned driver by telephone and, if required, sends a repair vehicle.

The present invention addresses deficiencies of known breakdown services.

In the case of the method according to the present invention for the wireless diagnosis, elimination of a defect, r for a servicing and/or for preparing a servicing of a motor vehicle, a checking device checks whether the vehicle has a technical defect, whether a vehicle servicing should be carried out and/or whether the driver is requesting assistance, for example, breakdown assistance by pressing a button.

A status determining device determines which electrical and/or electronic components or which hardware and/or, if applicable, which assigned software versions are present in the concrete vehicle, and/or which defects have occurred during the operation of the vehicle and were stored in the vehicle in the form of defect data and/or which vehicle servicing should be carried out and which corresponding servicing data were stored in the vehicle.

According to the invention, it is provided that only the driver can clear the establishment of a telecommunication connection between a service facility outside the vehicle and a service interface inside the vehicle after a corresponding offer to the driver.

During the telecommunication connection, identification data of the concerned vehicle and/or the hardware information determined by the status determining device and or, if applicable, information concerning assigned software versions are transmitted to the service facility outside the vehicle.

As a result of the measures according to the present invention, it is ensured that the driver's attention is explicitly drawn to a defect event or to an imminent servicing measure for which a communication connection with the service facility outside the vehicle is expedient. This also improves the care of the driver in the event of a breakdown. According to the present invention, the driver has to authorize the sending of the above-mentioned data or information, which may also comprise a GPS-position indication of the vehicle. As a result, the driver is enabled to decide whether data are transmitted from his vehicle. In addition, it is ensured that a data connection is established only if required and, as a rule, only for a short time and that, without an enabling by the driver, no unnoticed data exchange can take place between the vehicle and an external communication facility.

According to the invention, the term "motor vehicle" or "vehicle" is used to identify any type of motor vehicle, including motor vehicles with four or two wheels, such as a passenger car or a motorcycle.

In a further development of the present invention, it is provided that a mobile telephone assigned to the driver is present in the vehicle, which the driver normally takes along and by means of which he also carries out telephone conversations outside the vehicle, and a mobile telephone interface is provided in the vehicle. The mobile telephone interface according to the present invention causes the mobile telephone, after an enabling by the driver, to establish the telecommunication connection between the service facility outside the vehicle and the service interface inside the vehicle. During the telecommunication connection, the identification data of the concerned vehicle and/or the hardware information determined by the status determining device and/or, if applicable, information concerning the assigned software versions and/or the stored defect data are transmitted to the service facility outside the vehicle. By using the driver's mobile telephone on the basis of the mobile telephone interface according to the invention in the vehicle, a rarely used mobile telephone device or mobile communication device present in the vehicle for this special purpose will not be necessary for the data exchange. Also, no corresponding subscriber identification module card (SIM card) may be required, which additionally reduces the costs of the method according to the invention and thereby increases the acceptance by the customers.

The term "mobile telephone" according to the present invention also includes so-called personal digital assistants (PDAs) which, in addition to being suitable for making telephone calls, can also be used for the data exchange. Examples of PDAs are the so-called "BlackBerry" of Research in Motion Co. or the "IPAQ" of the Hewlett Packard Co. If the mobile telephone or the PDA is equipped with a GPS receiver or an assisted GPS receiver, the position information of the vehicle, as an alternative or in addition, can be determined by this GPS receiver, and the position information can be transmitted to the service facility outside the vehicle.

In an embodiment of the invention, it is provided that, after the transmission of the identification data and/or of the information or data determined by the status determining device, the telecommunication connection is automatically interrupted by a disconnecting device of the mobile telephone interface. The driver is identified by the service facility outside the vehicle preferably on the basis of the telephone number also transmitted or cleared by the mobile telephone during the telecommunication connection, or its SIM card and/or the web address of the mobile telephone or vehicle.

As a result, the driver can be recognized without time-consuming questions and competent care can be taken of the driver on the basis of the history of his vehicle which is stored in a computer.

In an embodiment of the present invention, it is provided that the mobile telephone interface of the vehicle is supplied with a telephone number and/or a web address or the like of the service facility outside the vehicle, for establishing the telecommunication connection. The latter can be protected against a falsification or an unauthorized change by means of a manipulation protection device. Manipulations on the vehicle can be prevented by these measures according to the present invention; the driver or the vehicle can only establish connections with a trustworthy facility whose telephone number, web address or the like is stored in the vehicle or is stored in a manner protected against manipulation.

In a further development of the present invention, the service facility outside the vehicle checks whether a software update is available based on the identification data transmitted by the vehicle or of the information determined by the status determining device. As a result, it becomes possible to largely automatically and therefore cost-effectively update the concerned vehicle or vehicles in which the situation is identical with respect to their software status and to rapidly eliminate the same defects or potential effects on vehicles of the corresponding vehicle series.

One embodiment of the present invention provides that the service facility outside of the vehicle, after an inquiry which the driver can reject, about establishing a data communication—originating from the mobile telephone—informs the driver of the existence of a software update, and a transmission of the software update into the vehicle cannot take place before the driver has triggered a corresponding first clearing operation.

The driver therefore maintains control over which technical measures are carried out on his vehicle, and it is ensured that the establishment of a data connection can only be initiated by the mobile telephone; that is, a call or the like by a facility outside the vehicle can cause no data connection to the mobile telephone on the part of the facility outside the vehicle for transmitting data into the vehicle.

In a further development of the present invention, the identification data of the vehicle received by the service facility outside the vehicle are analyzed, and a test program assigned to the specific vehicle for the detailed determination of the vehicle status is transmitted into the vehicle by way of the mobile telephone interface if the driver has previously been informed thereof and the driver has knowingly triggered a corresponding second clearing operation. This measure allows the detailed determination of the cause of a defect; thereby accelerating the elimination of the defect, in which case the access to the electronic unit or the bus system and the connected components of the vehicle can take place only after the approval by the driver. In addition, this prevents an unnoticed automatic access to the vehicle electronic system for the purpose of a manipulation.

In a further development of the present invention, the vehicle status determined by the test program or status data describing this status are transmitted by way of the mobile telephone interface of the vehicle and the driver's mobile telephone to the service facility outside the vehicle. It is provided that the transmission cannot take place before the driver has knowingly triggered a corresponding third clearing operation. This increases the checking possibilities for the driver and prevents that data are retrieved unnoticed from the vehicle.

In an embodiment of the present invention, it is provided that the service facility outside the vehicle analyzes the status data and, by means of a data communication by way of the mobile telephone or the mobile communication interface of the vehicle, accesses one or more control devices or other electronic components for eliminating a defect or for servicing purposes, or changes the assigned software status when the driver has previously knowingly triggered a corresponding fourth clearing operation. As a result, also the external access to the electronic components for the purpose of changing the status of the vehicle from its software status is placed under the driver's control.

In one embodiment of the present invention, an access checking device, which is protected against manipulation, is provided in the vehicle and/or in the mobile telephone interface. The access checking device has a final positive list with admissible access measures to the hardware and/or software of the vehicle and checks at least one data-related access measure reaching the vehicle by way of the mobile telephone interface as to whether it is contained in the positive list and is therefore considered to be admissible. As a result, a checking of the software changes which can be carried out on the vehicle can be achieved in an easy and easily examinable manner. The positive list can, for example, be designed to be unchangeable so that it cannot be changed at least by facilities outside the vehicle.

In an embodiment of the present invention, a change of the status of the vehicle or of its software status carried out or caused by the service facility outside the vehicle is documented by a documentation device inside the vehicle and/or by a service facility outside the vehicle. This can take place if the driver has previously knowingly triggered a corresponding fifth clearing operation. This makes available a history of the changes, and it is can be understood that the changes have taken place with the driver's approval.

In another embodiment of the present invention, the forwarded status data and/or the forwarded servicing data are transmitted to the vehicle dealer who is assigned to the vehicle or to the forwarded vehicle identification data, for agreeing on a repair or servicing date. Preferably, the possibly cleared telephone number of the calling mobile telephone and/or the web address of the mobile telephone or of the vehicle is also transmitted to the vehicle dealer for a return call to the driver. The forwarding of the data or of a portion of the data to the vehicle dealer preferably does not take place before the driver has previously knowingly triggered a corresponding sixth clearing operation. As a result, the servicing of his vehicle can be offered to the driver at the appropriate time. In this case, the driver determines whether corresponding data should be passed along for this purpose.

In another embodiment of the present invention, an updating device provided in the vehicle and/or in the mobile telephone interface periodically and/or in an event-controlled manner, for example, after the occurrence of a defect in the operating devices of the vehicle, establishes a telecommunication connection with the service facility outside the vehicle by way of the mobile telephone. The identification data of the concerned vehicle and/or the hardware information and/or the information concerning the assigned software versions and/or the stored defect data are transmitted to the service facility outside the vehicle; the service facility transmits a software update meant for the concerned vehicle, which software update is installed in the vehicle by an updating device. The periodic and/or event-controlled updating operation is preferably not carried out before the driver of the vehicle has knowingly cleared a corresponding seventh clearing operation for a current update and/or future updates.

In an embodiment of the present invention, two or more of the above-mentioned clearing operations are triggered by a single bundled clearing operation, in which case, before triggering the bundled clearing operation, the driver can be informed as to which individual clearing operations are involved. This minimizes the expenditures for the driver and nevertheless permits him to fully control the concerned operations.

In an embodiment of the invention, the above-mentioned measures can be triggered or carried out only by a user or driver who has been authorized with respect to the vehicle, for example, by the input of a correct PIN (personal identification number) or by the use of a special key of several vehicle keys.

BRIEF DESCRIPTION OF THE DRAWINGS

The invention will be explained in detail in the following by means of an embodiment and in connection with the sole FIGURE.

DETAILED DESCRIPTION

Figure 1A:
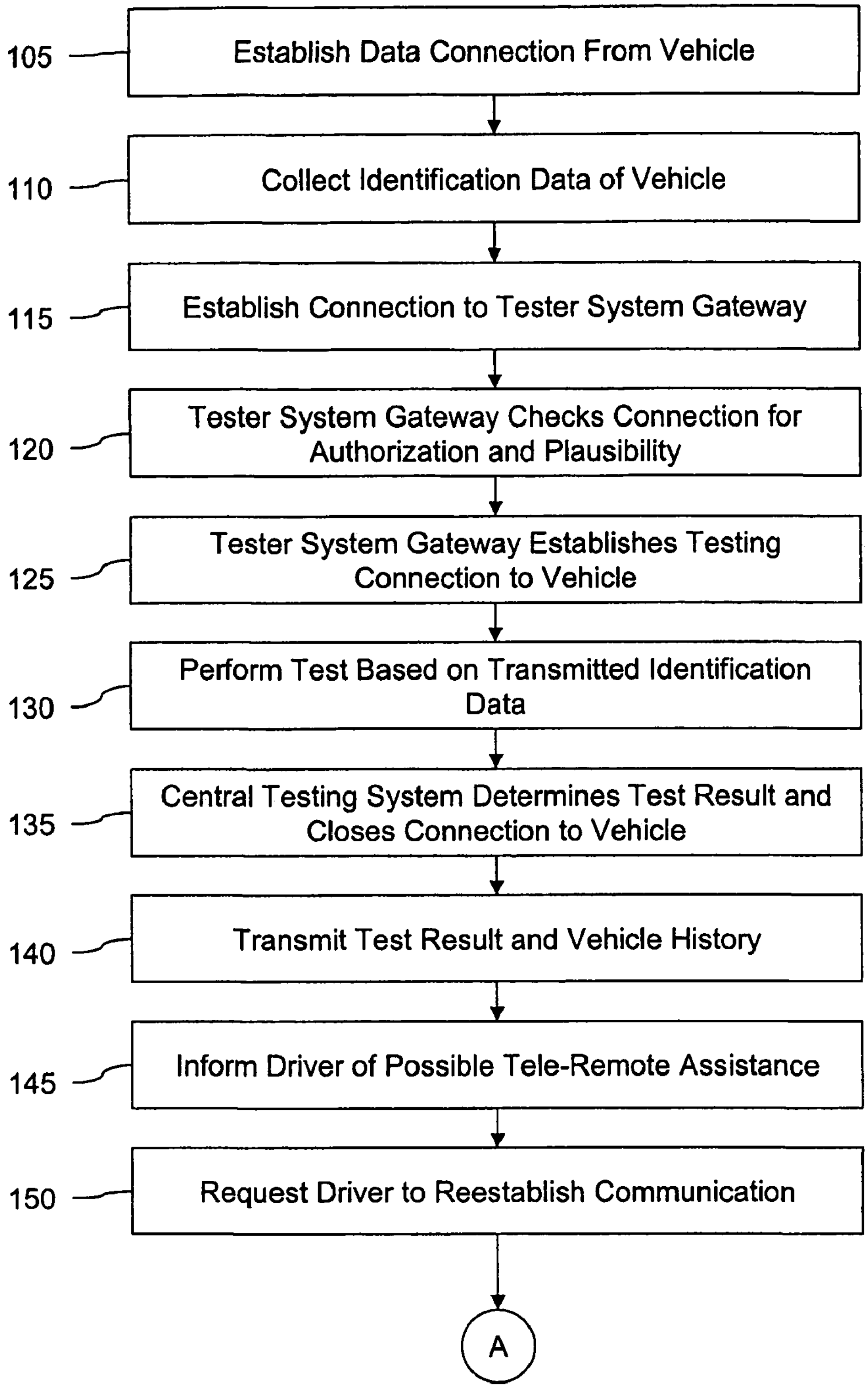
Figure 1B:
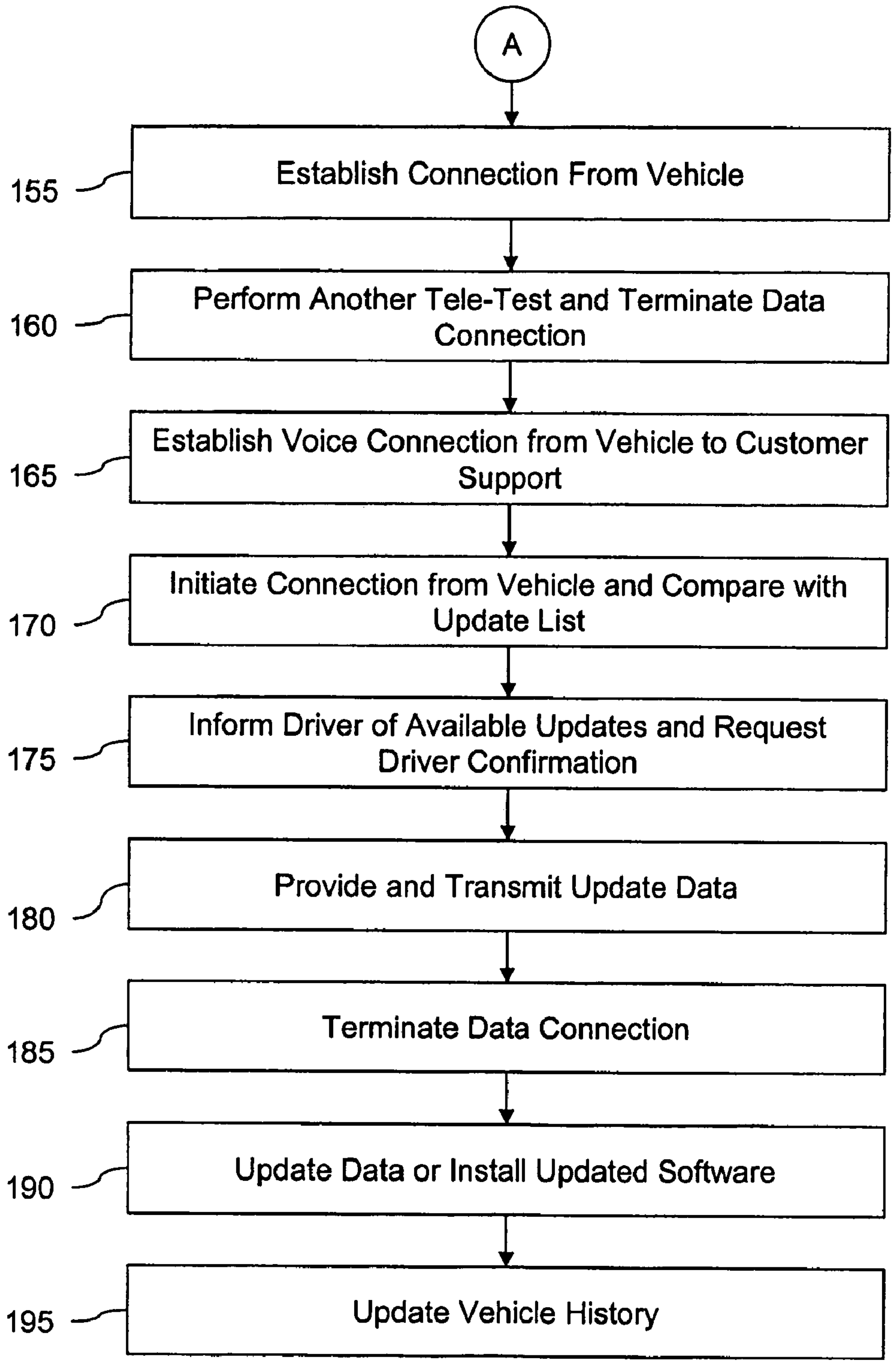

A so-called "tele-test" according to the invention operates as follows. The data communication in the vehicle is started based on the available mobile communication systems connected with the vehicle from a vehicle application (software). The application is started by occurring service-relevant events, such as a wear report, the detection of a servicing requirement, or by an initiation by the driver, as particularly in the event of a breakdown or a disturbance at the vehicle.

According to the present invention, the vehicle application has a reading access to the electrical or electronic components installed in the vehicle. Using the reading access to the electrical or electronic components installed in the vehicle, the vehicle application collects identification data of the vehicle.

The vehicle application establishes a data connection based on the Internet protocol (IP) by the selection of a mobile communication internet access. In the Internet, the mobile communication Internet access switches to the address of a switchboard.

In the switchboard, a connection is established to the given destination address of a tester system gateway. The tester system gateway checks the established connections with respect to authorization and plausibility. The authorization is checked on the basis of the identification data of the vehicle and agreed encodings in comparison to a registered user management. Plausibility rules filter out unauthorized accessing attempts according to operational rules.

The tester system gateway establishes a testing connection to the vehicle. Based on the transmitted identification data of the vehicle, a test takes place which is filed in shop testing systems.

A central testing system determines the test result and closes the connection to the vehicle. The test result is documented in a so-called "central vehicle history". The test result and the vehicle history are transmitted to the subsequent process for a customer support or to the customer support facility of the vehicle manufacturer or as information for the servicing appointment.

A so-called "tele-remote" assistance according to the invention has the following sequence and follows the above-described tele-test according to the invention. After a preceding tele-test, the driver is informed by the customer support concerning a possible tele-remote assistance. After the switching of a bypass in the switchboard for the customer support, the driver or user is asked to reestablish the communication.

After checking the vehicle status and the driver's consent, a connection is established from the vehicle. By the bypass, the connection is implemented to the customer support or customer support facility. The customer support is then capable of influencing individual electrical or electronic components and/or their software. The influence possibilities are prescribed by a controlling positive list stored in the vehicle.

For concluding the tele-remote assistance, another tele-test preferably takes place in order to check and/or document the effectiveness of the tele-remote assistance. Subsequently, the data connection is terminated by the customer support.

After an authorization by the driver, a voice connection can then be established from the vehicle to the customer support, and the customer support inquires about the effect of the implemented tele-remote assistance according to the invention and discusses possibly required follow-up measures with the driver or user.

A so-called "tele-update" according to the invention has the following sequence. During each communication connection between the switchboard of the vehicle manufacturer initiated by the driver or the mobile telephone of the vehicle, a comparison takes place with an update list. In this list, known updates, which can be installed by way of the tele-update are set up, in addition to the vehicle inventory detected in the registered user management.

When updates are available for the particular vehicle, the driver is informed of the selection possibility of the tele-update or the possibility of the update in a repair shop by the vehicle application or the vehicle software and, if applicable, is asked to confirm by way of the vehicle application that the tele-update now is to take place on the vehicle online.

The above-described tele-test can take place before the data transmission of the tele-update. The tele-test has the purpose of checking whether the current vehicle status or the current software versions of the vehicle corresponds or correspond to the stored history. If the actual status deviates from the documented status of the vehicle, a tele-update may possibly not be carried out, or a different tele-update can be transmitted into the vehicle beforehand or again and may be installed there.

After the verification, the providing and transmitting of the update data into the vehicle takes place by way of the testing system. The testing system documents the implemented process step in each case. After the transmission has taken place, the data connection is preferably terminated by the testing system. In the next state of the vehicle considered safe, for example, when the parking brake is active while the ignition is switched on, the vehicle application (software) will offer the installation of the update data to the driver.

If the driver consents, for example, by operating a button of the vehicle application, the vehicle is changed to the operating mode and the update data or the updated software are/is installed. During the installation, the energy status of the vehicle and of the concerned electronic components is monitored.

After the installation of the update data, the above-described tele-test is carried out and the vehicle history is updated. Deviations are transmitted as information to the servicing appointment of the customer support.

In an embodiment of the invention, the above-mentioned measures can be triggered or carried out only by a user or driver, who was authorized with respect to the vehicle, for example, by the input of a correct PIN (personal identification number) or by the use of a special vehicle key of several vehicle keys.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for wireless diagnosis, elimination of a defect, for a servicing, or for preparing a servicing of a motor vehicle, the method comprising the acts of:

checking, by a checking device, whether the vehicle has a technical defect, whether a vehicle servicing should be carried out or whether the driver is requesting assistance;

determining, by a status determining device, which electrical or electronic components, hardware, or assigned software versions are present in the concrete vehicle, or determining which defects have occurred during the operation of the vehicle and were stored in the vehicle in the form of defect data, or which vehicle servicing should be carried out and which corresponding servicing data were stored in the vehicle; and establishing a telecommunication connection between a service facility outside the vehicle and a service interface inside the vehicle, wherein only a driver of the vehicle can clear the establishment of the telecommunication connection after a corresponding offer to the driver, and during the telecommunication connection, identification data of the concerned vehicle, the hardware information determined by the status determining device or information concerning assigned software versions are transmitted to the service facility outside the vehicle.

2. The method according to claim 1, wherein a mobile telephone, which can be operated outside of the vehicle, assigned to the driver is in the vehicle, and a mobile telephone interface is provided in the vehicle which, after a clearance by the driver, causes the mobile telephone to establish the telecommunication connection between the service facility outside the vehicle and the service interface inside the vehicle, and to transmit the identification data of the concerned vehicle, the hardware information determined by the status determining device, information concerning the assigned software versions or the stored defect data to the service facility outside the vehicle.

3. The method according to claim 2, wherein, after the transmission of the identification data or the information or data determined by the status determining device, the telecommunication connection is automatically interrupted by a disconnecting device of the mobile telephone interface, and the driver is identified by the service facility outside the vehicle based on a telephone number of the mobile telephone transmitted by the mobile telephone during the telecommunication connection, a SIM card, or an internet address of the mobile telephone or vehicle.

4. A method according to claim 2, wherein the mobile telephone interface of the vehicle is supplied with a telephone number or internet address the service facility for establishing the telecommunication connection, wherein the internet address is protected against a falsification or an unauthorized change by a manipulation protection device.

5. A method according to claim 1, wherein the service facility examines whether a software update is available based on the identification data transmitted by the vehicle or the information determined by the status determining device.

6. A method according to claim 5, further comprising the acts of:

receiving an inquiry from the service facility about establishing a data communication originating from the mobile telephone, wherein the driver can reject the inquiry; and informing the driver of existence of a software update, wherein transmission of the software update into the vehicle cannot take place before the driver has triggered a corresponding first clearing operation.

7. A method according to claim 1, further comprising the acts of:

analyzing the identification data of the vehicle received by the service facility; and transmitting a test program assigned to the vehicle for detailed determination of the vehicle status to the vehicle via the mobile telephone interface if the driver has previously been informed thereof and the driver has knowingly triggered a corresponding second clearing operation.

8. A method according to claim 7, wherein the vehicle status determined by the test program or status data describing this status are transmitted via the mobile telephone interface of the vehicle and the driver's mobile telephone to the service facility, and wherein the transmission cannot take place before the driver has knowingly triggered a corresponding third clearing operation.

9. A method according to claim 8, wherein the service facility outside the vehicle analyzes the status data and, using a data communication by way of the mobile telephone or the mobile communication interface of the vehicle, accesses one or more control devices or other electronic components for eliminating a defect, for servicing purposes, or changes the assigned software status if the driver has previously knowingly triggered a corresponding fourth clearing operation.

10. A method according to claim 1, wherein an access checking device, which is protected against manipulation, is provided in the vehicle or in the mobile telephone interface, the access checking device has a final positive list with admissible access measures to the hardware or software of the vehicle and checks at least one data-related access measure reaching the vehicle by way of the mobile telephone interface as to whether it is contained in the positive list and is therefore considered to be admissible.

11. A method according to claim 1, wherein a change of the status of the vehicle or of its software status carried out or caused by the service facility outside the vehicle is documented by a documentation device inside the vehicle or by a service facility outside the vehicle, if the driver has previously knowingly triggered a corresponding fifth clearing operation.

12. A method according to claim 1, wherein the status data or the servicing data are transmitted to a vehicle dealer assigned to the vehicle or to the vehicle identification data, for agreeing on a repair or servicing date, wherein the telephone number of the calling mobile telephone, the internet address of the mobile telephone, or of the vehicle is transmitted to the vehicle dealer for a return call to the driver, or the forwarding of the data or of a portion of the data to the vehicle dealer does not occur e before the driver has previously knowingly triggered a corresponding sixth clearing operation.

13. A method according to claim 9, wherein two or more of the clearing operations are triggered by a single bundled clearing operation, in which case, before triggering the bundled clearing operation, the driver is informed as to which individual clearing operations are involved.

14. A method according to claim 1, wherein an updating device provided in the vehicle or in the mobile telephone interface, periodically or in an event-controlled manner, establishes a telecommunication connection with the service facility outside the vehicle via the mobile telephone, transmits the identification data of the vehicle, the hardware information, the information concerning the assigned software versions or the stored defect data to the service facility, the service facility transmits a software update for the vehicle to the updating device, which software update is installed in the vehicle by the updating device, the periodic or event-controlled updating operation not being carried out before the driver of the vehicle has knowingly cleared a corresponding seventh clearing operation for a current update or future updates.

* * * * *